J. F. O. STRATTON.
AUTOMATIC LUBRICATING DEVICE FOR MAGNETO BEARINGS.
APPLICATION FILED NOV. 22, 1917.
1,316,655.
Patented Sept. 23, 1919.
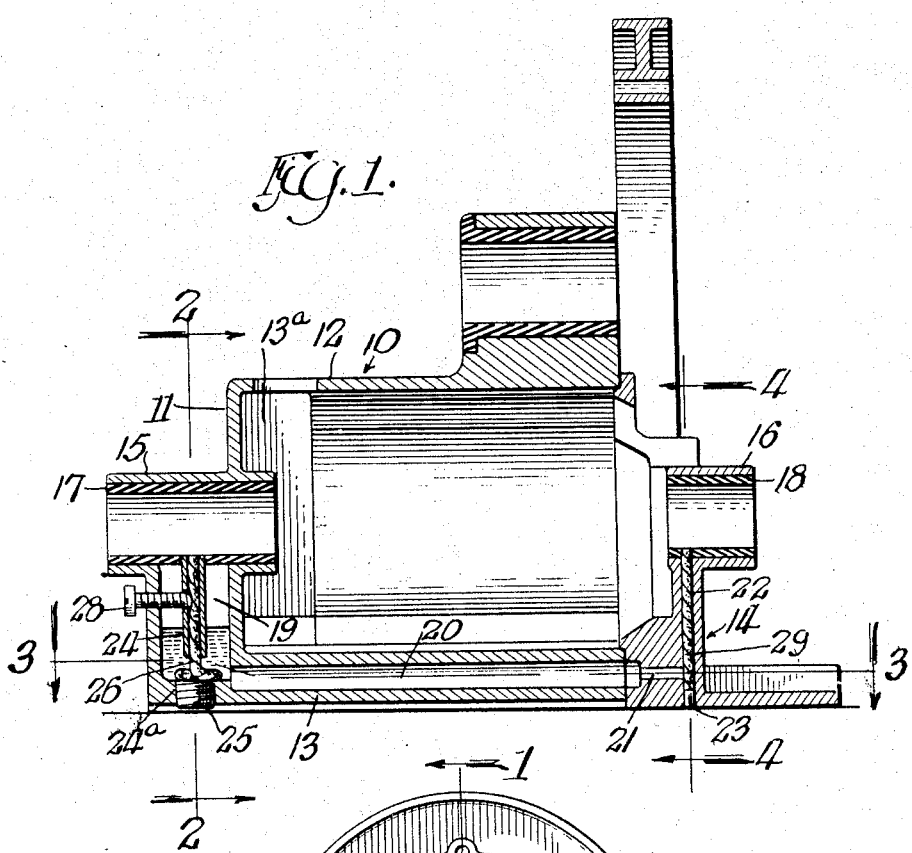
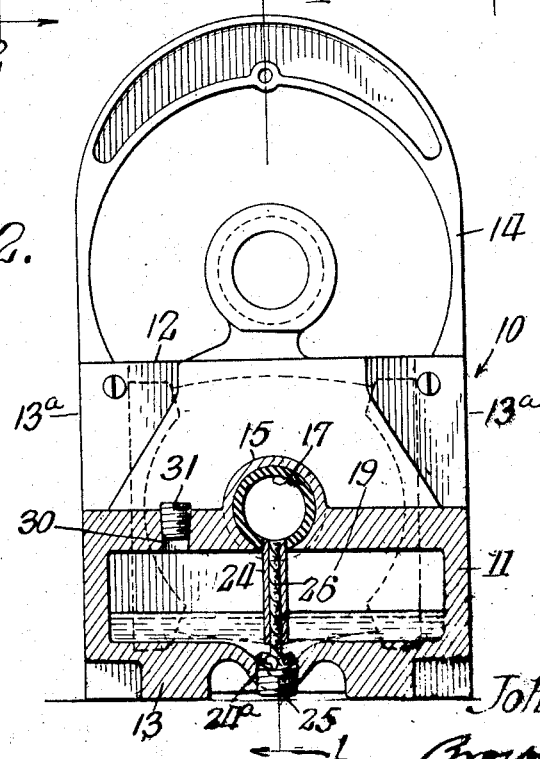

J. F. O. STRATTON.
AUTOMATIC LUBRICATING DEVICE FOR MAGNETO BEARINGS.
APPLICATION FILED NOV. 22, 1917.

1,316,655. Patented Sept. 23, 1919.
2 SHEETS—SHEET 2.

Witnesses:

Inventor
John F. O. Stratton
by Briesen & Schilling Attys

UNITED STATES PATENT OFFICE.

JOHN F. O. STRATTON, OF ELKHART, INDIANA, ASSIGNOR TO STANDARD IGNITION COMPANY, OF ELKHART, INDIANA, A CORPORATION OF INDIANA.

AUTOMATIC LUBRICATING DEVICE FOR MAGNETO-BEARINGS.

1,316,655.    Specification of Letters Patent.    Patented Sept. 23, 1919.

Application filed November 22, 1917. Serial No. 203,396.

*To all whom it may concern:*

Be it known that I, JOHN F. O. STRATTON, a citizen of the United States, and a resident of Elkhart, in the county of Elkhart and State of Indiana, have invented certain new and useful Improvements in Automatic Lubricating Devices for Magneto-Bearings; and I do hereby declare that the following is a full, clear, and exact description thereof, reference being had to the accompanying drawings, and to the letters of reference marked thereon, which form a part of this specification.

This invention relates to a novel, automatic lubricating device, especially designed for magneto bearings, and consists of the matters hereinafter described and more particularly pointed out in the appended claims.

In the lubrication of magneto bearings it is of prime importance that sufficient oil be continuously supplied to the bearings; but at the same time, an excess of oil must be prevented from entering the journal boxes, since from there the excess oil will escape to the housing which contains the magneto armature and the high tension collector ring and brush, all of which it is highly essential to keep clean and free from oil.

The object of the present invention is to provide a lubricating device for magneto bearings which may be filled with oil when the magneto is manufactured and which will thereafter automatically and continuously supply just the necessary amount of oil to the bearings for an indefinite length of time, without recharging. The advantages of the invention will appear as I proceed with my specification.

In the drawings:

Figure 1 is a view representing a longitudinal, central section through a magneto frame provided with my improved lubricating device, the plane of the section being indicated by the line 1—1 of Fig. 2.

Fig. 2 is a view representing a vertical section through the magneto frame, the plane of the section being indicated by the line 2—2 of Fig. 1.

Figure 3:
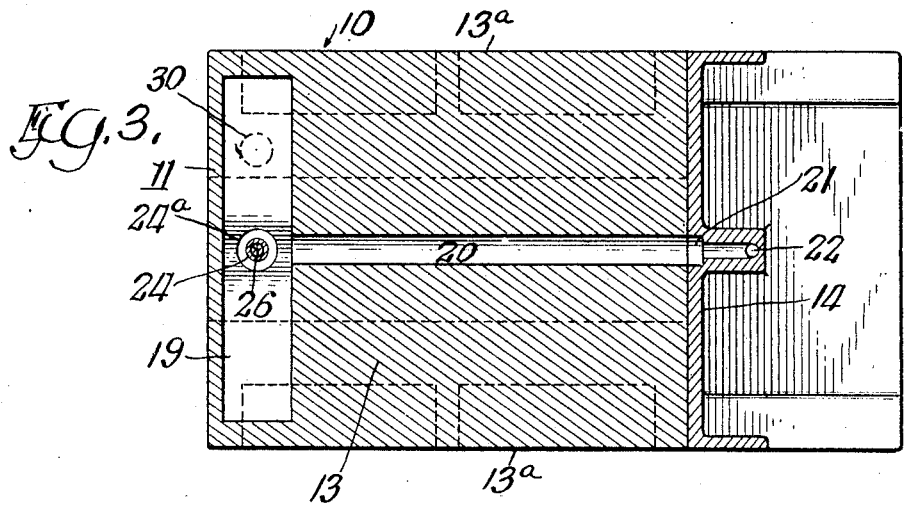
Fig. 3 is a view representing a horizontal section through the magneto frame, the plane of the section being indicated by the line 3—3 of Fig. 1.
Figure 4:
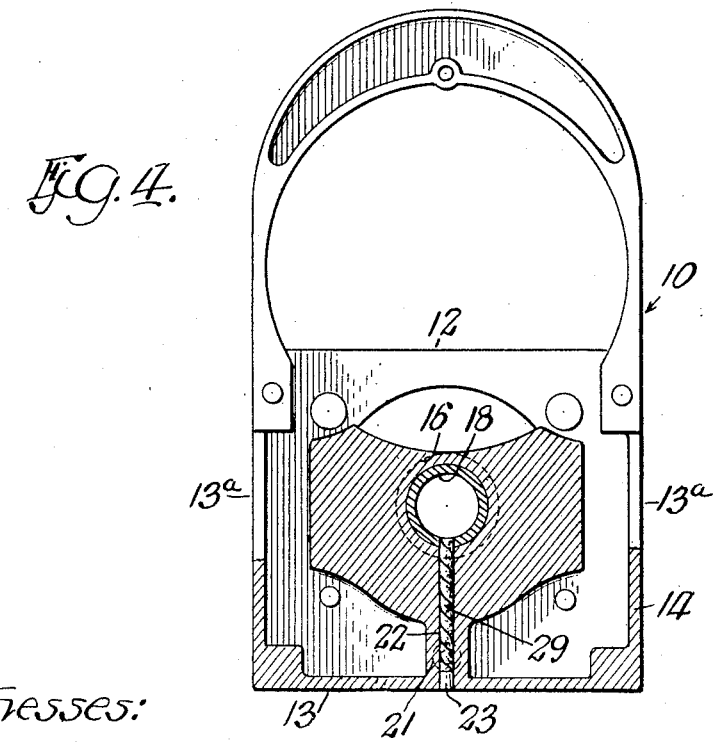
Fig. 4 is a view representing a vertical section through the magneto frame, the plane of the section being indicated by the line 4—4 of Fig. 1.

Referring now in detail to that embodiment of my invention illustrated in the accompanying drawings:—10 indicates as a whole the frame casing of a magneto having my improved lubricating means provided therein. As shown, said casing comprises an integral, hollow casting, open at the front end and having an upright rear end wall 11, a top wall 12, a bottom wall 13, and upright side walls 13ᵃ, 13ᵃ. At the open front end of the casing is attached an upright end bracket plate 14. In the rear end wall 11 is provided a horizontally disposed bearing sleeve 15, and a similar bearing sleeve 16 is provided in the bracket plate 14. Said sleeves are the bearings for the magneto shaft (not shown) and contain suitable bushings 17 and 18.

Below one of the bearing sleeves and in the wall or plate carrying said sleeve, namely, the rear end wall 11 of the casing as illustrated, is formed a reservoir space or well 19 which is preferably of a width approximating the width of the said end wall. This well 19 communicates with a horizontally disposed, longitudinally extending conduit 20 formed in the bottom wall 13 of the casing. In the upright end plate 14 is formed a short, horizontal conduit 21 which forms a continuation of the conduit 20 in the bottom wall 13, and this conduit 21 communicates with an upright passage 22 formed in said end plate 14. The upright passage 22 is formed by drilling through from the bottom of the end plate up and through the bushing 18 of the front bearing sleeve 16, the bottom end of said passage being closed by a plug 23.

24 indicates a small tube which has screw threaded engagement with and depends from the bushing 17 of the rear bearing sleeve 15 into the well 19. Said tube is adapted to be threaded into place through an opening 24ᵃ formed in the bottom wall 13 of the casing, a plug 25 closing said opening after said tube is in place. 26 indicates a wick of felt or other suitable material which is inserted into said tube 24 and depends into the well 19 below the bottom of said tube. Said wick, of course, is inserted into the tube before the tube is threaded into the bushing from below and its top end is adapted to engage against the magneto shaft, so that oil continuously drawn up through the wick by capillary attraction will be delivered to said shaft and by that distributed throughout the bearing.

A screw 28 is preferably threaded through the end wall 11 of the casing and into the wick tube 24 to engage and compress the wick to choke down or obstruct the flow of oil through the wick, thus providing means for controlling the amount of oil supplied to the bearing. A second wick 29 is placed in the upright passage 22 with its top end engaged in an opening in the bushing 18 of the front bearing sleeve 16, so that it will engage the front end of the magneto shaft and supply oil to its bearing. A hole 30, normally closed by a screw plug 31, is provided in the top wall of the well 19, for filling the well.

After the magneto is assembled, the well 19 is filled with oil through the opening 30 to any desired level. As shown the said well is approximately half full. The oil in the well flows into the conduit 20 in the bottom wall 13 and into the passage 22. As the wicks 26 and 29 depend into the oil, they will act by capillary attraction to draw up the oil and transmit the same to the associated bearing bushings and through the holes in said bushings to the shaft, by the rotation of which the oil will be caused to work either way from its point of initial application.

I have found that a very small amount of oil, after the bearing is covered with oil in the first instance, will act to thoroughly lubricate the magneto shaft and bushings and the amount of oil consumed in this manner is so small as to be incapable of being measured. The result is that after the well 19 has been initially charged with the lubricating oil, the magneto will run indefinitely without refilling the well.

It will be noted that no flooding of the bearings with oil can occur, since the oil well or reservoir is placed below the bearings and the capillary attraction of the wicks alone is depended upon to supply oil to the bearings. Thus all danger due to an excess supply of oil and the resultant flow of that excess to the armature casing is eliminated. Another advantage of the lubricating device and of its operation as heretofore described, is, that when the magneto shaft ceases to rotate, the feed of oil to the bearings of the shaft will at once stop,—this because the wicks being saturated and the rotation of the shaft being depended upon to distribute the oil from the top end of the wick throughout the bearing, the rotation of the shaft is required to draw a supply of oil from the wick to the bearing. Thus, the construction is absolutely automatic in that the oil is not only supplied to the bearing continuously while the shaft is rotating, but the supply ceases entirely when the shaft stops.

While in describing my invention I have referred to certain details of construction and arrangement of parts, I do not wish to be limited thereto, except as may be pointed out in the appended claims.

I claim is my invention:

1. An oiling device for magneto bearings comprising in combination with a magneto frame and a bearing for the magneto shaft, means in the magneto frame providing an oil well below said shaft, a wick tube secured in an opening in the bearing and depending into said oil well, a wick supported in said tube and depending at one end into the oil well below the tube and at its other end engaging the magneto shaft, and means operable from the outside of the magneto frame for compressing said wick in said wick tube.

2. An oiling device for magneto bearings comprising in combination with a magneto frame and a bearing for the magneto shaft, means in the magneto frame providing an oil well below said shaft, a wick tube secured in an opening in the bearing and depending into said oil well, a wick supported in said tube and depending at one end into the oil well below the tube and at its other end engaging the magneto shaft, and a screw operable from the outside of the magneto frame threaded into said wick tube for engagement with said wick.

3. An oiling device for magneto bearings comprising in combination with a magneto frame and bearings for the magneto shaft, means in the magneto frame providing an oil well below one of said bearings, a wick passage below the other bearing and a conduit in the bottom of the frame connecting the bottom of said oil well with said wick passage, and vertical wicks, one depending into the oil well and the other depending through said wick passage, each wick projecting through openings provided in the bearings and engaging the magneto shaft.

4. An oiling device for magneto bearings, comprising in combination with a magneto frame and bearings for the magneto shaft, means in the magneto frame providing an oil well below one of said bearings, a wick passage below the other bearing and a conduit in the bottom of the frame connecting the bottom of said oil well with the bottom of said wick passage, a tube opening through and depending from one bearing into said well, and vertical wicks, one located in said tube and depending into the oil well and the other depending through said wick passage, each wick projecting through openings provided in the bearings and engaging said shaft.

5. An oiling device for magneto bearings, comprising in combination with a magneto frame and the bearing sleeves and bushings for the magneto shaft, means in the magneto frame providing an oil well below one of said bearing sleeves, a wick passage below the other bearing sleeve and a conduit in the bottom of the frame connecting the bottom of said oil well with the bottom of said wick passage, a wick tube opening through and depending from one bearing sleeve and bushing into said well, vertical wicks, one located in said tube and depending into the oil well and the other depending through said wick passage, each wick projecting through openings provided in the bearing sleeves and bushings and engaging said shaft, and a screw operable from the outside of said frame and threaded through said wick tube for engagement with said wick therein.

In testimony that I claim the foregoing as my invention I affix my signature in the presence of two witnesses, this 7th day of November, A. D. 1917.

JOHN F. O. STRATTON.

Witnesses:
KARL W. DOLL,
T. H. ALFREDS.